United States Patent [19]

Martin

[11] 4,268,019

[45] May 19, 1981

[54] FIXTURE AND METHOD FOR REPAIRING TRACK LINKS

[75] Inventor: Dean W. Martin, Peoria, Ill.

[73] Assignee: Caterpillar Tractor Co., Peoria, Ill.

[21] Appl. No.: 85,649

[22] PCT Filed: Apr. 30, 1979

[86] PCT No.: PCT/US79/00283

§ 371 Date: Apr. 30, 1979

§ 102(e) Date: Apr. 30, 1979

[87] PCT Pub. No.: WO80/02396

PCT Pub. Date: Nov. 13, 1980

[51] Int. Cl.³ ............................................. B25B 1/20
[52] U.S. Cl. .................................. 269/43; 29/402.01;
269/47; 269/909
[58] Field of Search .................... 269/43, 47, 52, 54.5,
269/219, 243, 289 R, 321 W, 321 F; 29/402.01,
402.03, 426; 254/29 R

[56] References Cited

U.S. PATENT DOCUMENTS

| | | | |
|---|---|---|---|
| 1,938,375 | 12/1933 | Coffee | 269/47 |
| 2,644,497 | 7/1953 | Wilmer et al. | 269/52 |
| 3,012,593 | 12/1961 | Williams | 269/321 F |
| 3,030,766 | 4/1962 | Slipp | 269/47 |
| 3,545,069 | 12/1970 | Krieger | 269/47 |
| 3,641,666 | 2/1972 | Scaminaci et al. | 269/47 |
| 3,726,506 | 4/1973 | Vanderwaal et al. | 254/29 R |
| 4,014,534 | 3/1977 | Ahlquist | 269/47 |

FOREIGN PATENT DOCUMENTS 1204292 9/1970 United Kingdom .

Primary Examiner—Robert C. Watson
Attorney, Agent, or Firm—Phillips, Moore, Weissenberger, Lempio and Majestic

[57] ABSTRACT

A fixture (10) for repairing track links (19) comprises support members (15) having a plurality of locating pins (18) for positioning the links (19) thereon. A plurality of clamping bars (24) each extends through a group of laterally aligned links (19) to secure them in place on the support members (15). In carrying forth the method of this invention, a link assembly is separated into its individual links (19) which are mounted in longitudinally aligned and side-to-side relationship on the fixture (10). The fixture and method of this invention provide for the economical and expeditious repair of the links (19) by compactly mounting the links (19) on the fixture.

27 Claims, 5 Drawing Figures

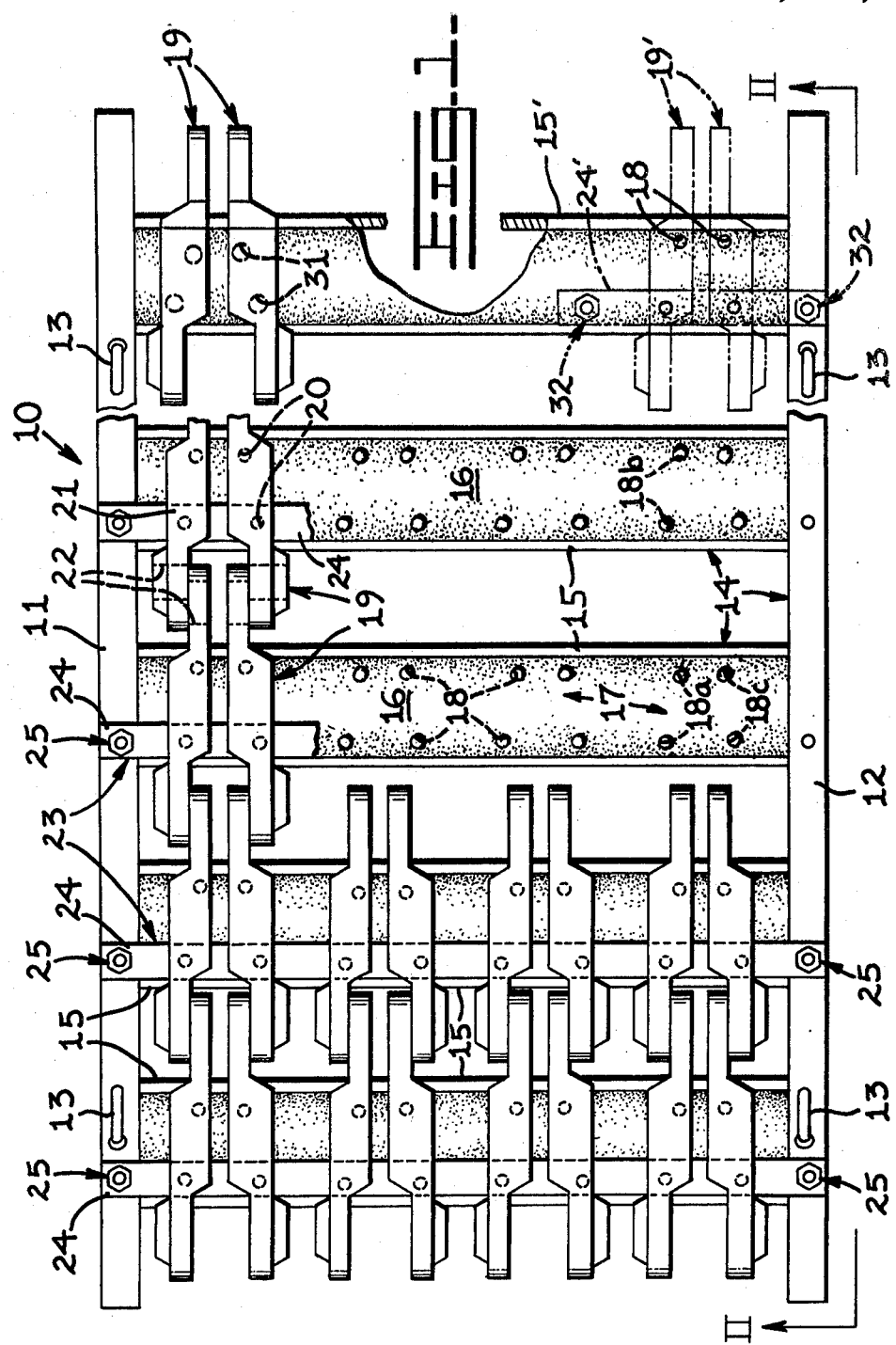

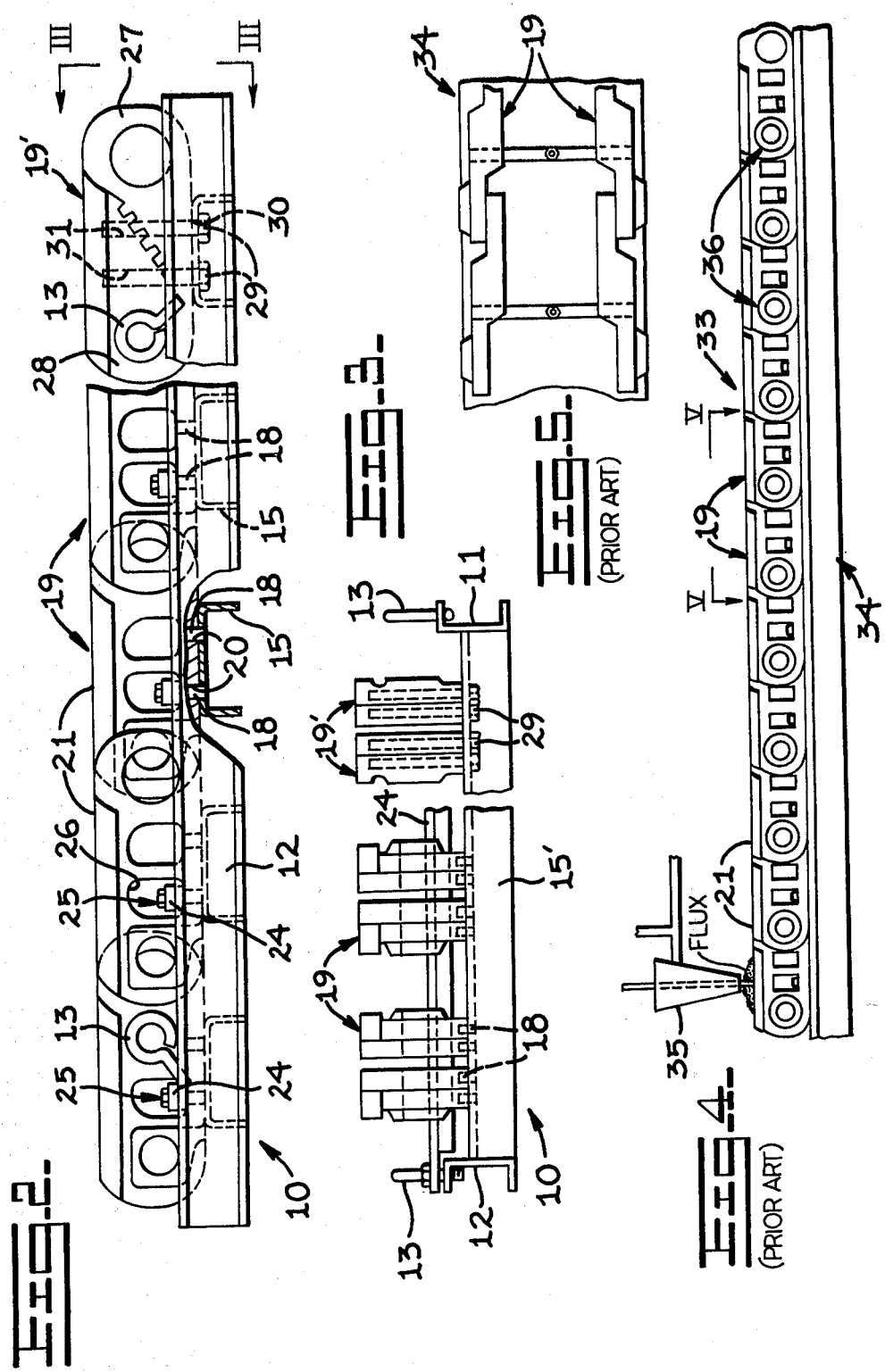

FIXTURE AND METHOD FOR REPAIRING TRACK LINKS

TECHNICAL FIELD

This invention relates to a fixture and method for repairing link assemblies adapted for use on track-type vehicles.

BACKGROUND ART

Track assemblies employed on track-type vehicles, such as tractors, require periodic disassembly for repair purposes. Such repair includes turning or replacement of worn bushings, the repair or replacement of seals employed in the articulated joints of the track assemblies, and a rebuilding or replacement of worn track link rails.

It is common practice in carrying forth the latter rebuilding process to remove a link assembly from the track shoes of a track assembly and position it in a link welder where flux is applied and welding heads build-up the rail surfaces of the track links with a hard metal alloy. This procedure requires a substantial amount of space due to the overall length of the required machinery, requires a substantial number of shut-off patterns for the link welder, a further requires the handling of a substantial quantity of flux.

In addition, the articulated joints of many track assemblies employ pin and bushing assemblies of the sealed and lubricated type therein which include rubber or plastic seals. In processes wherein the pin and bushing assemblies are left intact during welding, the seals employed in such assemblies require protection against the heat generated during the welding process. This protection is normally accomplished by either providing suitable heat dams or water beds to prevent damage to the seals.

In processes wherein the pin and bushing assemblies and seals therefor are removed prior to the welding process, a positioning fixture is normally provided for the individual track links to hold them in position while rebuilding their rail surfaces on a submerged arc link welder, for example. The latter type of fixture requires a considerable amount of manual handling of the track links and thus renders the welding procedure laborious and somewhat uneconomical. Furthermore, these type of fixtures do not lend themselves to the efficient storage of the track links of a particular link assembly.

DISCLOSURE OF THE INVENTION

The present invention is directed to overcoming one or more of the problems as set forth above.

In one aspect of this invention, a fixture for repairing link assemblies of a track assembly for a track-type vehicle comprises support means for supporting a plurality of track links thereon, locating means for positioning the links on upper surfaces of the support means to expose upper rail surfaces of the track links, and clamping means for clamping the track links on the upper surfaces of the support means.

In another aspect of this invention, a method for mounting a link assembly of a track assembly for a track-type vehicle on a fixture comprises the steps of separating the link assembly into individual track links, and mounting the track links in aligned relationship with respect to each other on upper surfaces of the fixture to expose upper rail surfaces of the track links for repair purposes.

The fixture and method of this invention thus provide for the economical and expeditious repair of the links. In particular, a particular link assembly is adapted to be broken-down into its individual links for compact and spaced securance thereof on the fixture whereby space requirements for the welding operation are greatly reduced, manual handling of the individual track links is reduced to a minimum, efficient transport of the loaded fixture can be readily accomplished by an overhead crane or lift truck, and the quantity of flux and shut-off patterns for the link welder are greatly reduced in comparison with conventional welding methods.

BRIEF DESCRIPTION OF THE DRAWINGS

Other objects of the invention will become apparent from the following description and accompanying drawings wherein:

FIG. 1 is a partially sectional top plan view of a fixture embodiment of the present invention, showing a plurality of track links secured thereon;

FIG. 2 is a partially sectioned side elevational view of the fixture with the track links secured thereon, taken in the direction of arrows II—II in FIG. 1;

FIG. 3 is a sectioned and elevational view of the fixture with the track links secured thereon, taken in the direction of arrows III—III in FIG. 2;

FIG. 4 partially illustrates a prior art apparatus and method for repairing track links; and FIG. 5 is a partial top plan view of the apparatus, taken in the direction of arrows V—V in FIG. 4.

BEST MODE OF CARRYING OUT THE INVENTION

FIG. 1 illustrates a frame-like fixture 10 comprising a pair of laterally spaced and parallel longitudinal members 11 and 12, shown in the form of standard channels. Lifting means comprising a plurality of eye bolts 13 are secured on the upper side of members 11 and 12 to provide lifting means for attachment to chains (not shown) to facilitate handling of fixture 10 by an overhead crane, a lift truck, or the like. In the embodiment illustrated, a pair of eye bolts 13 are secured in longitudinally spaced relationship to each member 11 and 12.

Support means 14, shown as comprising a plurality of longitudinally spaced and laterally extending cross-members 15 also in channel form, are welded or otherwise suitably secured in perpendicular relationship between rails 11 and 12. As more clearly shown in FIGS. 2 and 3, upper surfaces 16 of cross-members 15 are disposed vertically below upper sides of longitudinal member 11 and 12 for purposes hereinafter explained. Each surface 16 may be coated with a thin positive electrical grounding plate of copper or aluminum to prevent inadvertent flash welding of the links thereat and to improve the electrical grounding of the welding current.

Locating means 17, shown in the form of a plurality of upstanding pins or pin means 18, are secured on upper surface 16 of each cross-member 15 and function to precisely position all of the links 19 of a single link assembly on support means 14. Each standard link has a pair of longitudinally spaced and slightly offset holes 20 formed therein to secure a track shoe (not shown) thereto in a conventional manner. Each pin 19 projects upwardly into a respective hole 20, as more clearly shown in FIGS. 2 and 3. As shown in FIG. 1 a first pair 18a of pin means 18 are disposed in at least approximate longitudinal alignment with respect to a second pair 18b of longitudinally spaced pin means and also in at least approximate transverse alignment with a third pair 18c of the pin means.

It should be further noted that each link 19 has an upper rail surface 21 defined thereon which is rebuilt after wear occurs by a conventional welding method to provide a hardened wear surface for engagement with track rollers (not shown) for example, of a standard track-type vehicle. Furthermore, a pair of bushing bores 22 are formed laterally through each link 19 to each receive a standard pin and bushing assembly therein upon assembly. As shown in FIG. 1, the overlapping ends of each pair of longitudinally adjacent links 19 are disposed to at least approximately align bores 22 thereof to facilitate their cleaning. The resulting longitudinally aligned and side-to-side relationship of the links provides for a compact arrangement to facilitate processing thereof in a manner hereinafter described.

A plurality of clamping means 23 are provided on fixture 10 for releasably clamping links 19 on support means 14 of fixture 10. In the embodiment illustrated, each clamping means 23 may comprise a transversely disposed clamping bar 24 releasably secured at opposite ends thereof on members 11 and 12 by bolts 25. As more clearly shown in FIGS. 2 and 3, each clamping bar 24 extends through aligned windows 26, formed through a plurality of laterally spaced links 19, to clamp the links on support means 14. As mentioned above, cross-members 15 of support means 14 are disposed vertically below the upper side of longitudinal member 11 and 12 to facilitate the clamping function of bars 24.

As shown in FIGS. 1-3, a pair of standard master links 19', each including a pair of separable parts 27 and 28, may be suitably secured on a slightly modified cross-member 15'. In particular, a pair of bolts 29 may be inserted upwardly through holes 30, formed through cross-member 15', and threadably secured within threaded bores 31, formed in each master link 19'. Alternatively, upstanding pins (not shown) could be secured to cross-member 15' to receive bores 31 thereon.

As shown in FIG. 1, an optional, shortened clamping bar 24' may be employed with fixture 10 to secure a pair of track links 19 to cross-member 15' to accommodate a particular link assembly having an odd number of links. It should be understood that if so desired, clamping bar 24' could be lengthened and additional locating pins 18 secured on cross-member 15' to accommodate one or two more pairs of links thereon.

INDUSTRIAL APPLICABILITY

Fixture 10 is particularly adapted for the mounting of the track links of a full link assembly thereon for repair and/or storage purposes.

In order to remove a track assembly from a track-type vehicle, parts 27 and 28 of master links 19' would be disconnected by bolts 29. The track assembly would then be shipped to a repair facility whereafter the track shoes would be removed from the link assembly. The pin and bushing assemblies pivotally interconnecting longitudinally adjacent pairs of links 19 together would be then removed by a standard track press. Many such pin and bushing assemblies are of the sealed and lubricated type, employing elastomeric seals therein which would be prone to damage should they be left intact during the subsequent welding process.

The individual track links 19 and 19' with their seals (not shown) removed are then mounted in longitudinally aligned and side-to-side relationship with respect to each other on fixture 10, as shown in FIG. 1. Links 19 are located on support means 14 by pins 18 which project into the standard bolt-receiving holes 20 of the links. Thus, pins 18 of locating means 17 precisely position and space links 19 on fixture 10 and prevent lateral movement of the links thereon. When the link assembly employs master track links 19' therein, the master track links are secured to cross-member 15' by bolts 29 in the manner described above.

A clamping bar 24 is then inserted transversely through aligned windows 26 of each group of laterally spaced links 19 and is clamped to members 11 and 12 by bolts 25. When the link assembly employs an odd number of pairs of links, shortened clamping bar 24' may be utilized to secure the odd pair of links to cross-member 15' by bolts 32.

Lifting chains may then be attached to eye bolts 13 to transport fixture 10, having links 19 of a full link assembly mounted thereon, to a wash bay by an overhead crane or lift truck. The fixture is then passed through the wash bay to wash and clean the links, including rail surfaces 21 and bores 22 thereof. Fixture 10 is then transported to the link welder, packed in flux, and welded in a conventional manner to apply a layer of wear-resistant and hardened metallic material to rail surfaces 21.

Fixture 10 having repaired links 19 mounted thereon, may then be either stored for future use or transported to an assembly station to again reassemble the link assembly. Removal of links 19 from fixture 10 for assembly purposes would involve a reversal of the above steps for mounting the links on the fixture. In particular, removal of clamping bars 24 and 24' (when utilized), as well as bolts 29, will permit repaired links 19 and 19' to be removed from fixture 10. The links are thus ready for connection together by a standard track press which functions to secure a pin and bushing assembly within transversely aligned bores 22 of each adjacent pair of links 19.

FIGS. 4 and 5 illustrate a prior art apparatus 33 which includes a fixture 34 for clamping connected links 19 of a link assembly thereto. A welder 35 is then moved along fixture 34 in a continuous line to apply a metal build-up or weld to rail surfaces 21. It is obvious that apparatus 33 requires substantial floor space in a repair facility. Apparatus 33 also requires handling of a substantial amount of flux due to the high density packing of track links 19 and also substantial set-up time due to the need for a large number of shut-off patterns (e.g. forty) of welder 35.

Furthermore, the utilization of conventional apparatus 33 may require the use of a heat dam or water bed (not shown) therewith to prevent damage to seals employed in pin and bushing assemblies 36 when they are of the sealed and lubricated type. The liquid coolant employed in the water bed normally covers the sealed joint and any splashing thereof on rail surfaces 21 during the welding process could cause hydrogen embrittlement which could adversely affect the quality of the weld.

From the above description it can thus be seen that fixture 10 and the above-described method of this invention provide for the expeditious, economical, and compact mounting of links 19 of a full link assembly on the fixture thereon for repair and/or storage pupposes. Fixture 10 can be readily transported in a repair facility and the welding station and attendant apparatus therefor require substantially less floor space than conventional apparatus 33, shown in FIG. 4. Fixture 10 also provides for the precise positioning and spacing of links 19 thereon to faciliate the cleaning and welding procedures, as discussed above.

Other aspects, objects and advantages of this invention can be obtained from a study of the drawings, the disclosure and the appended claims.

I claim:

1. A fixture (10) for repairing track links (19) of a track assembly for a track-type vehicle comprising
    support means (14) for supporting a plurality of said track links (19) thereon,
    locating means (17) for positioning said track links (19) on upper surfaces (16) of said support means (14) to expose upper rail surfaces (20) of said track links (19), and
    clamping means (23) for releasably clamping said track links (19) on the upper surfaces of said support means (14).

2. The fixture of claim 1 further including a pair of longitudinally extending and laterally spaced longitudinal members (11,12) and wherein said support means (14) includes a plurality of longitudinally spaced and laterally extending cross-members (15) having said upper surfaces (16) defined thereon.

3. The fixture of claim 2 wherein said cross-members (15) are disposed vertically below upper sides of said longitudinal members (11, 12).

4. The fixture of claim 1 wherein said locating means (17) includes a plurality of upstanding pin means (18) for each engaging a hole (20) formed in a respective one of said tracks links (19).

5. A fixture of claim 4 wherein said support means (14) includes a plurality of longitudinally spaced members (15) and wherein each of said pin means (18) is secured on an upper surface (16) of each of said members (15) in upstanding relationship thereon.

6. The fixture of claim 4 wherein a first pair (18a) of said pin means (18) are disposed in at least approximate longitudinal relationship with respect to a second pair (18b) of longitudinally-spaced pin means (18) and also in at least approximate transverse alignment with respect to a third pair (18c) of said pin means (18).

7. The fixture of claim 1 wherein said clamping means (23) includes bar means (24) for extending through aligned windows (26) of a laterally aligned group of said tracks links (19). gh aligned windows (26) of a laterally aligned group of said tracks links (19).

8. The fixture of claim 7 further including a pair of laterally spaced members (11, 12) and wherein said clamping means (23) further includes means (25) for releasably securing said bar means (24) to said members (11, 12).

9. The fixture of claim 7 wherien a plurality of said bar means (24) are longitudinally spaced along said fixture (10) and wherein at least one of said bar means (24) has a length which is shorter than the other ones of said bar means (24).

10. The fixture of claim 1 wherein said support means (14) includes at least one member (15') having means for defining a plurality of holes (30) therethrough to receive bolts (29) for securing a pair of master links (19') to said member (15').

11. The fixture of claim 1 further including lifting means (13) for having chains attached thereto for lifting and transporting said fixture (10).

12. The fixture of claim 11 wherein said lifting means include a plurality of eye bolts (13).

13. A method for mounting track links (19) of a link assembly for the track assembly of a track-type vehicle on a fixture (10) for repair purposes comprising the steps of
    separating said link assembly into individual track links (19) and
    mounting said track links (19) in longitudinally aligned and side-to-side relationship with respect to each other on upper surfaces (16) of said fixture (10) to expose upper rail surfaces (21) of said track links (19).

14. The method of claim 13 further including a step of removing pin and bushing assemblies from said link assembly prior to said mounting step.

15. The method of claim 13 wherein said mounting step includes the step of locating each of said track links (19) on said fixture (10).

16. The method of claim 15 wherein said locating step includes the step of engaging a pin (18) secured on said fixture (10) within a hole (20) defined in each of said track links (19).

17. The method of claim 13 wherein said mounting step includes the step of releasably clamping said track links (19) on said fixture (10).

18. The method of claim 17 wherein said clamping step includes the steps of extending a clamping bar (24) through windows (26) defined through a plurality of laterally aligned track links (19) and releasably securing said clamping bar (24) to said fixture (10).

19. The method of claim 18 wherein said clamping step further includes the steps of extending a plurality of clamping bars (24) each through a separate group of laterally aligned track links (19).

20. The method of claim 19 wherein said clamping step further includes the step of clamping one pair of odd tracks links (19) of said track links (19) to said fixture (10) by a clamping bar (24') which has a length shorter than the other clamping bars (24).

21. The method of claim 13 wherein said mounting step includes the step of bolting a pair of master track links (19') to said fixture (10).

22. The method of claim 13 further including the step of disconnecting said link assembly from a track assembly of a track-type vehicle.

23. The method of claim 22 wherein said mounting step includes the step of mounting all of the track links (19) of only a single link assembly on said fixture (10).

24. A fixture (10) for repairing links (19) comprising
    support means (14) for supporting a plurality of links (19) thereon,
    locating means (17) for positioning said links (19) on said support means (14), and
    clamping means (23) for releasably clamping said links (19) on said support means (14), said clamping means (23) including bar means (24) for extending through aligned windows (26) of a laterally aligned group of said links (19).

25. A method for mounting links (19) of a link assembly on a fixture (10) for repair purposes comprising the steps of
    removing pin and bushing assemblies from said link assembly, separating said link assembly into individual links (19), and mounting said links (19) in longitudinally aligned and side-to-side relationship with respect to each other on said fixture (10).

26. A method for mounting links (19) of a link assembly on a fixture (10) for repair purposes comprising the steps of separating said link assembly into individual links (19), mounting said links (19) in longitudinally aligned and side-to-side relationship with respect to each other on said fixture (10), and releasably clamping said links (19) on said fixture (10) including the steps of extending a clamping bar (24) through windows (26) defined through a plurality of laterally aligned links (19) and releasably securing said clamping bar (24) to said fixture (10).

27. A method for mounting links (19) of a link assembly on a fixture (10) for repair purposes comprising the steps of separating said link assembly into individual links (19) and mounting said links (19) in longitudinally aligned and side-to-side relationship with respect to each other on said fixture (10), including the step of bolting a pair of master track links (19') to said fixture (10).

* * * * *